US008183322B2

(12) United States Patent
Gerard et al.

(10) Patent No.: US 8,183,322 B2
(45) Date of Patent: May 22, 2012

(54) COMPOSITION CONTAINING A LACTIC ACID HOMOPOLYMER AND A BLOCK COPOLYMER

(75) Inventors: Pierre Gerard, Denguin (FR); Christophe Navarro, Lahonce (FR)

(73) Assignee: Arkema France, Colombes (FR)

( * ) Notice: Subject to any disclaimer, the term of this patent is extended or adjusted under 35 U.S.C. 154(b) by 139 days.

(21) Appl. No.: 12/678,799

(22) PCT Filed: Aug. 26, 2008

(86) PCT No.: PCT/FR2008/051530
§ 371 (c)(1),
(2), (4) Date: Mar. 18, 2010

(87) PCT Pub. No.: WO2009/037412
PCT Pub. Date: Mar. 26, 2009

(65) Prior Publication Data
US 2010/0184926 A1 Jul. 22, 2010

(30) Foreign Application Priority Data
Sep. 19, 2007 (FR) ..................... 07 06583

(51) Int. Cl.
*C08L 53/00* (2006.01)
*C08L 67/00* (2006.01)
*C08L 69/00* (2006.01)
(52) U.S. Cl. ............ 525/92 R; 525/88; 525/93; 525/94; 525/218; 525/221; 525/222; 525/227; 525/231
(58) Field of Classification Search .......... 525/92, 525/93, 94, 218, 221, 222, 227, 231, 88
See application file for complete search history.

(56) References Cited

U.S. PATENT DOCUMENTS

| 5,252,642 A | 10/1993 | Sinclair et al. | |
|---|---|---|---|
| 2004/0147674 A1* | 7/2004 | Kakeda et al. | 525/88 |
| 2009/0239433 A1* | 9/2009 | Kurihara et al. | 442/164 |

FOREIGN PATENT DOCUMENTS

| JP | 2007 023145 | 2/2007 |
|---|---|---|
| JP | 2007 099952 | 4/2007 |
| WO | WO 03/033592 | 4/2003 |
| WO | WO 2007/060930 | 5/2007 |
| WO | WO 2007/084291 | 7/2007 |

OTHER PUBLICATIONS

International Search Report dated Jan. 20, 2009.

\* cited by examiner

*Primary Examiner* — Ana Woodward
(74) *Attorney, Agent, or Firm* — RatnerPrestia

(57) ABSTRACT

The present invention relates to a composition containing at least one lactic acid homopolymer and at least one block copolymer with a polydispersity index ranging from 1.5 to 5 and comprising:
at least one block A that is miscible with the homopolymer and formed from monomers containing at least one methacrylate of formula $CH_2=C(CH_3)-COOR_1$, and
at least one block B that is immiscible with the homopolymer and formed from monomers containing at least one alkyl acrylate of formula $CH_2=CH-COOR_2$ and/or at least one methacrylate of formula $CH_2=C(CH_3)-COOR_3$.

The invention also relates to the use of this composition for the manufacture of medical articles, textile fibers, thermoformed plates or packaging, in particular films or bottles.

18 Claims, No Drawings

US 8,183,322 B2

COMPOSITION CONTAINING A LACTIC ACID HOMOPOLYMER AND A BLOCK COPOLYMER

CROSS REFERENCE TO RELATED APPLICATIONS

This is a U.S. National Phase application of application number PCT/FR2008/051530. filed Aug. 26, 2008, which claims priority benefit of FR0706583, filed Sep. 19, 2007 (both of which are incorporated herein by reference in their entirety).

FIELD OF THE INVENTION

Lactic acid is a biocompatible (bio-assimilable) and bio-recyclable, degradable precursor of polymers known as polylactic acid or poly(lactic acid) or polylactide or PLA. It is derived from renewable resources and is produced using biotechnologies, generally by fermentation of corn. On account of its rigidity, its transparency and its hydrophobicity, PLA finds various industrial applications, especially in the biomedical field, in textile fibers and in packaging, where it is an alternative of choice to PET (polyethylene terephthalate), a material that is unpopular on account of its remanence in the environment and whose petroleum origin makes its future use uncertain. However, although the enormous potential of PLA as a degradable material requires no further demonstration, its development remains, however, limited, especially on account of its high cost, and thus depends on the development of inexpensive industrial polymerization processes. The broadening of its applications also necessitates improvement of its thermal and mechanical properties. Thus, its elongation at break remains insufficient for use in the packaging sector.

BACKGROUND

To reinforce PLA-based matrices, use is conventionally made of impact modifiers, which, on account of their size (greater than 80 nm) and their optical index, scatter light once introduced into the matrix, which affects the transparency thereof. A reinforcer based on poly(methyl methacrylate) would have the same drawbacks. In addition, the heat resistance and the impact strength of PLA-based matrices reinforced with poly(methyl methacrylate) often needs to be improved, for example by incorporating therein an impact modifier of the methyl methacrylate/butadiene/styrene type such as the Clearstrength® impact modifiers from Arkema.

Another solution proposed in document WO 2007/084 291 for improving the flexibility and elongation of PLA without substantially affecting its transparency consists in mixing it either with a PLA-grafted acrylic copolymer, or with a block copolymer containing PLA blocks and blocks of a (meth) acrylic homopolymer, to form (meth)acrylic copolymer microdomains dispersed in a PLA matrix, or vice versa.

There is, however, still a need for another means for reinforcing PLA-based matrices without substantially affecting their transparency. Now, such matrices are known to be poorly compatible with other polymers, insofar as they are liable to be the site of chemical degradations leading to coloration of the matrix and to a loss of molecular weight. In addition, the adherence at the interface of the two materials is not always satisfactory, which affects the physical properties of the reinforced matrix and may in particular make it brittle.

The Applicant has, to its merit, developed mixtures of PLA with block copolymers that make it possible to overcome the deficiencies of the prior art.

These copolymers make it possible to obtain an organization of the material at the nanometer scale, not via mechanical mixing but via thermodynamically-governed self-organization of the molecules. This results in very significant reinforcement of the PLA-based matrix without substantially affecting its other properties and especially its transparency and its rigidity.

It is already known from document US 2004/0 147 674 that the flexibility and impact strength of a thermo-plastic resin such as PLA may be improved by combination with a linear or star block acrylic copolymer, such as a methyl methacrylate/n-butyl acrylate/methyl methacrylate triblock copolymer. This copolymer has a polydispersity index $Ip=Mw/Mn$ (in which Mw is its weight-average molecular mass and Mn is its number-average molecular mass) of not more than 1.8 and preferably of not more than 1.5. It may be prepared by living anionic polymerization, radical polymerization using a chain-transfer agent or living radical polymerization using, for example, a nitroxide. Atom-transfer radical polymerization, initiated with an organic halide and catalyzed with a metallic complex is, however, preferred.

Along the same lines, it has been envisaged in document WO 2007/060 930 to combine PLA with block acrylic copolymers, especially of the methyl methacrylate/butyl acrylate/methyl methacrylate type, in a PLA/copolymer weight ratio ranging from 97/3 to 40/60. These copolymers are obtained according to an atom-transfer radical or anionic polymerization process, in the presence of a transition metal and a halogenated compound used as initiator. This process gives them a polydispersity index of between 1 and 1.4.

Although the mixtures described in document WO 2007/ 060 930 are presented as having improved properties in terms of flexibility, moldability, hot-bonding ability, permeability to moisture, impact strength, flexural strength and resistance to elongation, without loss of transparency, these properties are obtained only for combinations that have a certain ratio of melt viscosities of the two constituents of the mixture. In particular, Table 2 of said document shows that compositions containing a weight ratio of PLA to the copolymer of 30/70 cannot afford the desired properties.

SUMMARY OF THE INVENTION

Now, it appeared to the Applicant that compositions containing a mixture of PLA and of block acrylic copolymer obtained according to a process different than that used in document WO 2007/060 930, and consequently having a polydispersity index of at least 1.5, would have better properties, and in particular a higher melt flow index facilitating their use, than the mixtures described in said document.

In addition, these properties may be achieved without significant loss of transparency, even at copolymer contents of greater than 65% by weight relative to the total weight of the mixture of copolymer and PLA.

One subject of the present invention is thus a composition containing at least one lactic acid homopolymer and at least one block copolymer with a polydispersity index ranging from 1.5 to 5 and comprising:

at least one block A that is miscible with the homopolymer and formed from monomers containing at least one methacrylate of formula $CH_2=C(CH_3)-COOR_1$ in which $R_1$ is a linear or branched $C_1$-$C_3$ alkyl group, a branched $C_4$ group, a $C_3$-$C_8$ cycloalkyl group, a $C_6$-$C_{20}$ aryl group, a $C_7$-$C_{30}$ arylalkyl group containing a $C_1$-$C_4$ alkyl group, a heterocyclic group or a heterocyclylalkyl group containing a $C_1$-$C_4$ alkyl group, these groups being optionally substituted with one or more identical or different groups chosen from halogen and hydroxyl groups, and at least one block B that is immiscible with the homopolymer and formed from monomers containing:

at least one alkyl acrylate of formula $CH_2=CH-COOR_2$ $CH_2=CH-COOR_2$ in which $R_2$ is a linear or branched $C_1$-$C_{12}$ alkyl group optionally substituted with one or more identical or different groups chosen from halogen and hydroxyl groups, and/or at least one methacrylate of formula $CH_2=C(CH_3)-COOR_3$ in which $R_3$ is a linear $C_4$-$C_{12}$ alkyl group or a branched $C_5$-$C_{12}$ alkyl group.

DETAILED DESCRIPTION OF THE INVENTION

According to the invention, the term "block copolymer" means a linear or star block copolymer or, by extension, a gradient copolymer. This copolymer is considered as an individual species, in self-supported form, and not as a structure grafted onto another (co)polymer such as the shell of a core-shell system conventionally used as impact modifier. Moreover, it is understood that the copolymer according to the invention does not bear any PLA grafts.

The copolymer according to the invention has a poly-dispersity index Ip=Mw/Mn (in which Mw is its weight-average molecular mass and Mn its number-average molecular mass) ranging from 1.5 to 5 and preferably from 2 to 3.

Block A of the block copolymer according to the invention preferably has a glass transition temperature of greater than 0° C. It may comprise, for example, at least one monomer chosen from: methyl methacrylate, ethyl methacrylate, propyl methacrylate, isopropyl methacrylate, isobutyl methacrylate and tert-butyl methacrylate, or mixtures thereof.

According to one preferred embodiment of the invention, block A comprises or even is formed from methyl methacrylate monomers.

In addition, it is possible for block A to comprise, in addition to methacrylate, at least one dialkyl-acrylamide monomer in which the linear or branched alkyl groups independently contain from 1 to 10 carbon atoms, such as N,N-dimethylacrylamide.

For its part, block B preferably has a glass transition temperature of less than 0° C. and more preferentially of not more than −10° C.

Block B may thus comprise at least one monomer chosen from n-butyl acrylate, 2-ethylhexyl acrylate, hydroxy-ethyl acrylate, 2-ethylhexyl methacrylate and n-octyl acrylate, and mixtures thereof.

According to one preferred embodiment of the invention, block B is formed solely from n-butyl acrylate, 2-ethylhexyl acrylate, hydroxyethyl acrylate, 2-ethyl-hexyl methacrylate and n-octyl acrylate monomers, or mixtures thereof.

One particularly preferred example of a block copolymer according to the invention is a methyl methacrylate/n-butyl acrylate/methyl methacrylate block copolymer.

The copolymer used according to the invention may be obtained by controlled radical polymerization in the presence of a nitroxide, as described especially in patent application WO 03/062 293.

Such a process comprises the successive steps of:

1—preparing a monoalkoxyamine from a nitroxide, as described especially in patent application WO 2004/014 926,
2—preparing a polyalkoxyamine, especially a dialkoxyamine, from the monoalkoxyamine obtained in step 1, for example by reaction with an α,ω-diol containing end groups esterified with a carboxyvinyl compound such as (meth)acrylic acid, 3—preparing block B by polymerization of the corresponding monomers in the presence of the polyalkoxyamine obtained in step 2, up to a degree of conversion preferably of less than 90% and more preferentially of less than 80%, for example of 70%, 4—mixing the block B thus obtained with the monomers intended to form block A, 5—preparing block A using block B as polymerization initiator, and 6—removing the residual monomers that may be present in the copolymer thus obtained.

The nitroxides used in this process correspond, for example, to formula (III) below:

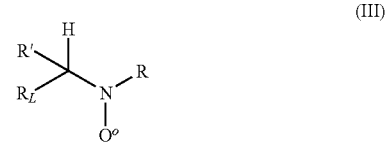

in which:

R and R', which may be identical or different, optionally connected together so as to form a ring, denote $C_1$-$C_{40}$ alkyl groups optionally substituted with one or more hydroxyl, alkoxyl or amino groups, R and R' preferably independently denoting an unsubstituted $C_1$-$C_{10}$ and more preferentially $C_1$-$C_6$ alkyl group, such as a tert-butyl group, and $R_L$ denotes a monovalent group with a molar mass of greater than 16 g/mol such as a dialkyl phosphonate group and in particular a diethyl phosphonate group.

In addition, the block copolymer that may be used according to the invention may be obtained commercially from the company Arkema under the trade name Nanostrength®.

For its part, the lactic acid homopolymer is especially commercially available under the reference 2002 D from the company Nature Works. It may especially have a number-average molecular mass Mn of between 20 000 and 100 000 g/mol and a polydispersity index ranging from 1 to 2.

The mixing of the lactic acid homopolymer and of the copolymer described previously may be performed by any means and especially by coextrusion, polymerization of the homopolymer in the presence of the preformed block copolymer or blending using an internal mixing chamber or a kneading machine of single-screw or twin-screw type. It is preferred for the mixing of the homopolymer and the block copolymer, which are each advantageously present in the form of granules, to be performed in a co-kneader, for example of the Buss type, at a temperature preferably in the region of 220° C.

According to one preferred embodiment of the invention, the weight ratio of the copolymer to the lactic acid homopolymer ranges from 30/70 to 80/20. More preferentially, the weight ratio of the copolymer to the lactic acid homopolymer ranges from 50/50 to 70/30. As a variant, the weight ratio of the copolymer to the lactic acid homopolymer may range from 65/35 to 80/20.

The composition according to the invention advantageously has a Haze value of less than 5% and a transmittance of greater than 80%, as measured according to ASTM standard D 1003.

A subject of the present invention is also the use of the composition described previously for the manufacture of medical articles, textile fibers, thermoformed plates or packaging, in particular films or bottles. The use of this composition for the manufacture of high-strength, transparent injection-molded articles may also be envisioned.

Finally, the invention relates to the use of a copolymer as defined in any one of claims 1 to 8 for improving the transparency, the fluidity, the deformation at break and/or the strength of a lactic acid homopolymer matrix.

The invention will be understood more clearly in the light of the examples that follow, which are given purely for illustrative purposes and are not intended to limit the scope of the invention, defined by the appended claims.

EXAMPLES

Example 1

Preparation of a Composition According to the Invention

1A—Preparation of the Block Copolymer

Preparation of 2-methyl-2-[N-tert-butyl-N-(diethoxy-phosphoryl-2,2-dimethylpropyl)aminoxy] propionic acid 500 ml of degassed toluene, 35.9 g of CuBr (250 mmol), 15.9 g of copper powder (250 mmol), 86.7 g of N,N,N',N',N"-pentamethyldiethylenetriamine or PMDETA (500 mmol) are placed in a 2 l glass reactor purged with nitrogen, followed by addition, with stirring and at room temperature (20° C.), of a mixture containing 500 ml of degassed toluene, 42.1 g of 2-bromo-2-methylpropionic acid (250 mmol) and 78.9 g of 84% SG1 (225 mmol), having the formula:

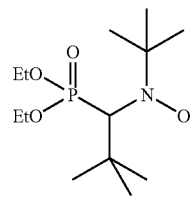

The reaction medium is reacted for 90 minutes at room temperature with stirring, and then filtered. The toluene filtrate is washed twice with 1.5 l of saturated aqueous $NH_4Cl$ solution.

A yellowish solid is obtained, which is washed with pentane to give 51 g of 2-methyl-2-[N-tert-butyl-N-(diethoxy-phosphoryl-2,2-dimethylpropyl)aminoxy]-propionic acid (yield: 60%). The structure is especially confirmed by mass spectrometry and $^1H$ NMR.

Preparation of a Dialkoxyamine 2 g of the monoalkoxyamine obtained as described above, 0.52 g of 1,4-butanediol diacrylate of purity >98% (1 eq.) and 6.7 ml of ethanol are placed in a 100 ml round-bottom flask purged with nitrogen. The mixture is refluxed for 20 hours at 78° C. and the ethanol is then evaporated off under vacuum. 2.5 g of a very viscous yellow oil are obtained.

Analysis by $^{31}P$ NMR shows the total disappearance of the monoalkoxyamine (27.4 ppm) and the appearance of the dialkoxyamine (multiplet at 24.7-25.1 ppm). Analysis by mass spectrometry of electrospray type reveals a mass of 961 ($M^+$).

Preparation of the Block Copolymer

The synthesis takes place in 2 steps:

1st Step: Bulk Preparation of a Living Poly(n-butyl Acrylate) Polymer 146 g of butyl acrylate and 3.93 g of dialkoxyamine obtained as described previously are placed in a 1 l polymerization reactor equipped with a variable-speed stirring motor, inlets for introducing reagents, lines for introducing inert gases to allow oxygen to be stripped out, temperature measuring probes, a vapor condensation system with reflux, and a jacket for heating/cooling the contents of the reactor by means of circulating a heat-exchange fluid therein. After degassing several times with nitrogen, the reaction medium is brought to 115° C. and this temperature is maintained by heat regulation for several hours.

Samples are taken throughout the reaction in order:
to determine the polymerization kinetics by gravimetry (measurement of the solids content),
to monitor the change of the number-average molecular mass (Mn) as a function of the conversion of the monomer into polymer.

When 70% conversion is reached, the reaction medium is cooled to 60° C. and the residual butyl acrylate is removed by evaporation under vacuum.

The molecular masses of the poly(n-butyl acrylate) in polystyrene equivalents are 49 090 g/mol for Mp (molecular mass at the top of the peak), 35 090 g/mol for Mn (number-average molecular mass) and 49 830 g/mol for Mw (weight-average molecular mass).

2nd Step: Reinitiation of the Living Poly(n-butyl Acrylate) with Methyl Methacrylate 142 g of methyl methacrylate and 305.6 g of toluene, which have been degassed beforehand, are added to the poly(n-butyl acrylate) prepared previously, at 60° C. The reaction medium is then heated at 105° C. for one hour, and then at 120° C. for a further one hour. The conversion reached is about 50%. After cooling to room temperature, the solution of copolymer (methyl methacrylate-b-n-butyl acrylate-b-methyl methacrylate) containing 50% by weight of n-butyl acrylate is removed from the reactor and the residual solvents and monomers are removed by evaporation under vacuum.

The molecular masses of the copolymer in polystyrene equivalents are 102 730 g/mol for Mp (molecular mass at the top of the peak), 63 800 g/mol for Mn (number-average molecular mass) and 131 130 g/mol for Mw (weight-average molecular mass). The polydispersity index is 2.05.

1B—Mixing of the Block Copolymer with the Lactic Acid Homopolymer

The copolymer prepared as described in Example 1A was mixed with polylactic acid (PLA) (2002 D from Nature Works) in a copolymer/PLA weight ratio of 60/40, in a Buss co-kneader at 220° C. The mixture was injected as a closed loop on a Billion injection press with a closing force of 70 tonnes. The injection temperature was 210° C. and the mold temperature was 20° C.

Example 2

Evaluation of the Mechanical and Optical Properties of the Compositions According to the Invention

2A—Protocols for the Tests Performed

The composition of Example 1B was subjected to various tests performed under the operating conditions detailed in Table 1 below.

TABLE 1

Tests performed on the PLA/block copolymer compositions

| Parameter tested (unit) | Standard or apparatus | Test conditions |
|---|---|---|
| Melt index or MI (g/10 min) | 4M009 (CEAST) | Temperature = 230° C. Load = 3.8 kg Premelt time: 4 min in piston contact, then 2 min under load |
| Flexural elastic modulus or FEM (MPa) | ISO 178 | Specimens injected: 80.0 × 10.10 × 4.08 mm Test speed: 1 mm/min Modulus points: 0.05 to 0.25% Span length: 64.64 mm Support radius: 5 mm |
| Tensile tests: stress at the flow threshold σy or SFT (MPa) and deformation at break (%) | ISO 572-2 | Specimens: 1A type dumbbells Lo = 50 mm Test speed: 5 mm/min → 3% elongation Test speed: 50 mm/min → 68% elongation Distance between jaws: 115 mm |
| Optical properties: Haze (%) and total transmittance or TT (%) and clarity (%) | ASTM D 1003 | Pieces 2 mm thick Angle >2.5° Disk thickness: 2 mm |
| Vicat thermal properties (° C.) | ISO 306 | Specimens: 1A type dumbbells Thickness: 4 mm Method B50 (50N - 50° C./hour) |
| Heat deflection temperature or HDT (° C.) | ISO 75-2 | Method Af (flattened out) Arrow: 0.33 mm Specimens injected: 80 × 10.10 × 4.08 mm Stress: 1.80 MPa Span length: 64 mm Ramp: 120° C./hour |

2B—Test Results

The results of the tests performed on the composition of Example 1B are given in Tables 2 and 3 below.

TABLE 2

Optical properties of the composition according to the invention

| | Color measurement | | | | Haze | Clarity | TT |
|---|---|---|---|---|---|---|---|
| | L | a | b | YI | (%) | (%) | (%) |
| PLA 2002D | 95.53 | −0.22 | 2.4 | 4.5 | 9.8 | 99.6 | 91.3 |
| PLA + 60% copolymer | 92.35 | −0.57 | 9.81 | 18.25 | 4.3 | 99.5 | 83.4 |

TABLE 3

Mechanical properties of the composition according to the invention

| Parameter tested | PLA 2002D | PLA + 60% copolymer |
|---|---|---|
| MI (g/10 min) | 62 | 91 |
| FEM (MPa) | 3724 | 1692 |
| SFT (MPa) | none | 29 |
| Deformation (%) | 3 | 68 |
| Notched Charpy (KJ/m$^2$) | 1.4 | 83 |
| Unnotched Charpy (KJ/m$^2$) | 19 | NB (>180) |
| HDT (° C.) | 55 | 57 |
| Vicat (° C.) | 58 | 52 |

As regards its optical properties, the composition according to the invention is slightly yellower than the reference PLA but this originates from the compounding and then injection conditions that were not optimized. On the other hand, the Haze value, which reflects the cloudiness of a composition due to light scattering, is reduced, while at the same time maintaining the clarity and without too much loss of transmittance.

As regards its mechanical properties, the fluidity of the composition according to the invention is very substantially improved. The stiffness (FEM) is halved, but maintains a level that is entirely acceptable for the intended applications. The increase in the elongation at break reflects the passage from brittle behavior to ductile behavior. Above all, the strength according to the notched Charpy test is considerably increased and it is impossible to break the sample in the case of the unnotched Charpy test (NB=non break), unlike the reference PLA, which breaks with resilience of 19 kJ/m$^2$.

The thermal properties of the PLA matrix remain unchanged, with or without reinforcement.

Example 3 (Comparative)

Evaluation of the Mechanical and Optical Properties of a PMMA-Reinforced PLA Matrix A lactic acid homopolymer matrix reinforced with poly (methyl methacrylate) sold by the company Arkema under the trade name Altuglas® V920 was prepared, in a manner similar to that of Example 1.

TABLE 4

Optical properties of a PLA/PMMA mixture

| | Color measurement | | | | Haze | Clarity | TT |
|---|---|---|---|---|---|---|---|
| | L | a | b | YI | (%) | (%) | (%) |
| PLA 2002D | 95.53 | −0.22 | 2.4 | 4.5 | 9.8 | 99.6 | 91.3 |
| PLA + 60% PMMA | 95.78 | −0.12 | 1.83 | 3.45 | 5.4 | 99 | 91.4 |

TABLE 5

Mechanical properties of a PLA/PMMA mixture

| Parameter tested | PLA 2002D | PLA + 60% PMMA |
|---|---|---|
| MI (g/10 min) | 62 | 21 |
| FEM (MPa) | 3724 | 3765 |
| SFT (MPa) | none | none |
| Deformation (%) | 3 | 3 |
| Notched Charpy (KJ/m$^2$) | 1.4 | 1.8 |
| Unnotched Charpy (KJ/m$^2$) | 19 | 18 |

TABLE 5-continued

Mechanical properties of a PLA/PMMA mixture

| Parameter tested | PLA 2002D | PLA + 60% PMMA |
|---|---|---|
| HDT (° C.) | 55 | 71 |
| Vicat (° C.) | 58 | 75 |

As emerges from these tables, the comparative composition is cloudier than that of Example 1B according to the invention. In addition, its melt index (MI), its deformation at break and its strength (Charpy) are markedly lower than those of the composition according to the invention.

The invention claimed is:

1. A composition comprising a) at least one lactic acid homopolymer and b) at least one block copolymer with a polydispersity index ranging from 1.5 to 5, wherein the block copolymer comprises:
at least one block A that is miscible with the lactic acid homopolymer and formed from monomers containing at least one methacrylate of formula $CH_2=C(CH_3)—COOR_1$ in which $R_1$ is a linear or branched $C_1$-$C_3$ alkyl group, a branched $C_4$ group, a $C_3$-$C_8$ cycloalkyl group, a $C_6$-$C_{20}$ aryl group, a $C_7$-$C_{30}$ arylalkyl group containing a $C_1$-$C_4$ alkyl group, a heterocyclic group or a heterocyclylalkyl group containing a $C_1$-$C_4$ alkyl group, these groups being optionally substituted with one or more identical or different groups selected from the group consisting of halogen and hydroxyl groups, wherein block A comprises, in addition to methacrylate, at least one dialkylacrylamide monomer in which the linear or branched alkyl groups independently contain from 1 to 10 carbon atoms, and
at least one block B that is immiscible with the lactic acid homopolymer and formed from monomers comprising one or more monomers selected from the group consisting of:
alkyl acrylates of formula $CH_2=CH—COOR_2$ in which $R_2$ is a linear or branched $C_1$-$C_{12}$ alkyl group optionally substituted with one or more identical or different groups selected from the group consisting of halogen and hydroxyl groups, and
methacrylates of formula $CH_2=C(CH_3)—COOR_3$ in which $R_3$ is a linear $C_4$-$C_{12}$ alkyl group or a branched $C_5$-$C_{12}$ alkyl group.

2. The composition as claimed in claim 1, wherein block A comprises or is formed from methyl methacrylate monomers.

3. The composition as claimed in claim 1, wherein block A has a glass transition temperature of greater than 0° C.

4. The composition as claimed in claim 1, wherein block B has a glass transition temperature of less than 0° C.

5. The composition as claimed in claim 1, wherein block B comprises at least one monomer selected from the group consisting of n-butyl acrylate, 2-ethylhexyl acrylate, hydroxyethyl acrylate, 2-ethylhexyl methacrylate and n-octyl acrylate, and mixtures thereof.

6. The composition as claimed in claim 5, wherein block B is formed solely from one or more monomers selected from the group consisting of n-butyl acrylate, 2-ethylhexyl acrylate, hydroxyethyl acrylate, 2-ethylhexyl methacrylate and n-octyl acrylate monomers, and mixtures thereof.

7. The composition as claimed in claim 1, wherein the block copolymer is a linear or star block copolymer or a gradient copolymer.

8. The composition as claimed in claim 1, wherein the block copolymer is obtained according to a process comprising the successive steps of:
1—preparing a monoalkoxyamine from a nitroxide,
2—preparing a polyalkoxyamine from the monoalkoxyamine obtained in step 1,
3—preparing block B by polymerization of the corresponding monomers in the presence of the polyalkoxyamine obtained in step 2, up to a degree of conversion of less than 90%,
4—mixing the block B thus obtained with the monomers intended to form block A,
5—preparing block A using block B as polymerization initiator, and
6—removing any residual monomers that may be present in the copolymer thus obtained.

9. The composition of claim 8, wherein the polyalkoxyamine is a dialkoxyamine.

10. The composition of claim 8, wherein the polyalkoxyamine is prepared by reacting the monoalkoxyamine with an $\alpha,\omega$-diol containing end groups esterified with a carboxyvinyl compound.

11. The composition as claimed in claim 1, wherein the lactic acid homopolymer has a weight-average molecular mass of between 20,000 and 100,000 g/mol.

12. The composition as claimed in claim 1, wherein the weight ratio of the block copolymer to the lactic acid homopolymer ranges from 30/70 to 80/20.

13. The composition as claimed in claim 12, wherein the weight ratio of the block copolymer to the lactic acid homopolymer ranges from 50/50 to 70/30.

14. The composition as claimed in claim 1, wherein the composition has a Haze value of less than 5% and a transmittance of greater than 80%, as measured according to ASTM standard D 1003.

15. A method of manufacturing an article selected from the group consisting of medical articles, textile fibers, thermoformed plates and packaging, wherein the method comprises using the composition as claimed in claim 1.

16. The method of claim 15, wherein the article is a film or bottle.

17. The composition of claim 1, wherein the block copolymer has a polydispersity index ranging from 2 to 3.

18. A method of improving at least one attribute of a lactic acid homopolymer matrix selected from the group consisting of transparency, fluidity, deformation at break, and strength, wherein the method comprises mixing a block copolymer with a lactic acid homopolymer, the block copolymer having a polydispersity index ranging from 1.5 to 5 and comprising:
at least one block A that is miscible with the lactic acid homopolymer and formed from monomers containing at least one methacrylate of formula $CH_2=C(CH_3)—COOR_1$ in which $R_1$ is a linear or branched $C_1$-$C_3$ alkyl group, a branched $C_4$ group, a $C_3$-$C_8$ cycloalkyl group, a $C_6$-$C_{20}$ aryl group, a $C_7$-$C_{30}$ arylalkyl group containing a $C_1$-$C_4$ alkyl group, a heterocyclic group or a heterocyclylalkyl group containing a $C_1$-$C_4$ alkyl group, these groups being optionally substituted with one or more identical or different groups selected from the group consisting of halogen and hydroxyl groups, wherein block A comprises, in addition to methacrylate, at least one dialkylacrylamide monomer in which the linear or branched alkyl groups independently contain from 1 to 10 carbon atoms, and at least one block B that is immiscible with the lactic acid homopolymer and formed from monomers comprising one or more monomers selected from the group consisting of:

alkyl acrylates of formula $CH_2=CH-COOR_2$ in which $R_2$ is a linear or branched $C_1$-$C_{12}$ alkyl group optionally substituted with one or more identical or different groups selected from the group consisting of halogen and hydroxyl groups, and methacrylates of formula $CH_2=C(CH_3)-COOR_3$ in which $R_3$ is a linear $C_4$-$C_{12}$ alkyl group or a branched $C_5$-$C_{12}$ alkyl group.

* * * * *